United States Patent
Yuen et al.

(10) Patent No.: US 10,162,865 B2
(45) Date of Patent: Dec. 25, 2018

(54) GENERATING IMAGE TAGS

(71) Applicant: Microsoft Technology Licensing, LLC, Redmond, WA (US)

(72) Inventors: Aaron Chun Win Yuen, Bellevue, WA (US); Alexandre B. R. Michelis, Bellevue, WA (US); Arun Sacheti, Sammamish, WA (US); Karim A. Hasham, Bellevue, WA (US); Yanfeng Sun, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 473 days.

(21) Appl. No.: 14/878,019

(22) Filed: Oct. 8, 2015

(65) Prior Publication Data
US 2017/0103072 A1   Apr. 13, 2017

(51) Int. Cl.
*G06F 17/30* (2006.01)

(52) U.S. Cl.
CPC .... *G06F 17/3053* (2013.01); *G06F 17/30253* (2013.01); *G06F 17/30265* (2013.01); *G06F 17/30268* (2013.01); *G06F 17/30867* (2013.01)

(58) Field of Classification Search
CPC .......... G06F 17/3053; G06F 17/30253; G06F 17/30268; G06F 17/30867; G06F 17/30265
USPC ...................................................... 707/748
See application file for complete search history.

(56) References Cited

U.S. PATENT DOCUMENTS

| | | | |
|---|---|---|---|
| 7,529,732 B2 | 5/2009 | Liu et al. | |
| 7,693,906 B1 | 4/2010 | Amidon et al. | |
| 8,171,043 B2 | 5/2012 | Murdock et al. | |
| 8,321,424 B2 | 11/2012 | Li et al. | |
| 8,352,465 B1 | 1/2013 | Jing et al. | |
| 8,452,794 B2 | 5/2013 | Yang et al. | |
| 8,457,416 B2 | 6/2013 | Liu et al. | |
| 8,478,052 B1* | 7/2013 | Yee ..................... | G06K 9/4676 382/155 |
| 8,855,430 B1 | 10/2014 | Alldrin et al. | |

(Continued)

FOREIGN PATENT DOCUMENTS

WO   2015035477 A1   3/2015

OTHER PUBLICATIONS

"International Search Report and Written Opinion Issued in PCT Application No. PCT/US2016/053859", dated Jan. 3, 2017, 10 pages.

(Continued)

*Primary Examiner* — Evan Aspinwall
(74) *Attorney, Agent, or Firm* — Shook, Hardy & Bacon, L.L.P.

(57) ABSTRACT

The technology described herein provides an efficient mechanism for generating image tags. Image data from a plurality of sources may be analyzed to identify relevant text items from the aggregated data. The relevant text items may be keywords describing a subject of an image, an entity of an image, a location of an image, or the like. From the aggregated image data, one or more image tags may be generated and stored as an offline dataset with an image identifier. Upon detecting a prompt such as a user issuing a search query for an image, the image identifier is used to perform a look up of the image and associated image tags to be provided.

14 Claims, 6 Drawing Sheets

(56) References Cited

U.S. PATENT DOCUMENTS

| | | | |
|---|---|---|---|
| 8,959,093 B1* | 2/2015 | Nerurkar | G06F 17/30867 707/706 |
| 2011/0106782 A1* | 5/2011 | Ke | G06F 17/30256 707/706 |
| 2012/0023103 A1* | 1/2012 | Soderberg | G06F 17/30265 707/739 |
| 2012/0027311 A1* | 2/2012 | Cok | G06F 17/30247 382/224 |
| 2012/0158721 A1* | 6/2012 | Hua | G06F 17/30256 707/736 |
| 2012/0203764 A1* | 8/2012 | Wood | G06F 17/30247 707/722 |
| 2013/0202205 A1* | 8/2013 | Liu | G06F 17/30268 382/170 |
| 2013/0204866 A1* | 8/2013 | Fork | G06F 17/30277 707/723 |
| 2014/0046935 A1* | 2/2014 | Bengio | G06F 17/30277 707/723 |
| 2014/0129981 A1* | 5/2014 | Soderberg | G06F 17/30265 715/810 |
| 2014/0146053 A1* | 5/2014 | Cragun | G06F 17/30247 345/467 |
| 2014/0280232 A1* | 9/2014 | Chidlovskii | G06F 17/30038 707/749 |
| 2015/0161086 A1* | 6/2015 | Wu | G06F 17/30247 715/234 |
| 2015/0161129 A1* | 6/2015 | Miller | G06F 17/3053 707/728 |
| 2015/0220567 A1 | 8/2015 | Folkens et al. | |

OTHER PUBLICATIONS

Zha, et al., "Visual Query Suggestion", In Proceedings of the 17th ACM international conference on Multimedia, Oct. 19, 2009, pp. 15-24.

Barnard, et al., "Matching Words and Pictures", In Journal of Machine Learning Research, vol. 3, Feb. 2003, pp. 1107-1135.

Ben-Haim, et al., "ImprovingWeb-based Image Search via Content Based Clustering", In Proceedings of Conference of Computer Vision and Pattern Recognition Workshop, Jun. 17, 2006, 6 pages.

Schmitz, Patrick, "Inducing Ontology from Flickr Tags", In Proceedings of 15th International World Wide Web Conference, May 22, 2006, 4 pages.

Sigurbjörnsson, et al., "Flickr Tag Recommendation based on Collective Knowledge", In Proceedings of 17th International Conference on World Wide Web, Apr. 21, 2008, pp. 327-336.

Cui, et al., "Real Time Google and Live Image Search Re-Ranking", In Proceedings of 16th ACM International Conference on Multimedia, Oct. 26, 2008, pp. 729-732.

Yee, et al., "Faceted Metadata for Image Search and Browsing", In Proceedings of SIGCHI Conference on Human Factors in Computing Systems, vol. 5, Issue 1, Apr. 5, 2003, pp. 401-408.

"Second Written Opinion Issued in PCT Application No. PCT/US2016/053859", dated Sep. 14, 2017, 5 Pages.

"International Preliminary Report on Patentability Issued in PCT Application No. PCT/US2016/053859", dated Jan. 17, 2018, 6 Pages.

* cited by examiner

GENERATING IMAGE TAGS

BACKGROUND

Image search involves quite a bit of exploration and discovery. Traditional search engines allow a user to refine image searches based on related searches, which may be textual query suggestions based on a user's original search query. The suggestions may be mined through session logs. Image search, however, is focused on images rather than text. A user would like to know a subject or topic of an image and, potentially, browse other images with the same subject or topic. This capability is lacking in current image searching.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, systems, methods, and computer-readable storage media are provided for generating image tags. Image data is analyzed from a plurality of sources including user profiles, session logs, etc. Based on the analysis, one or more image tags may be generated, offline, for images. The tags may be associated with an image identifier of the image and stored as an offline dataset. The dataset may then be provided in response to a prompt such as an indication of a search query for an image, loading of a web page with an image, or the like.

BRIEF DESCRIPTION OF THE DRAWINGS

Aspects of the technology described in the present application are described in detail below with reference to the attached drawing figures, wherein.

DETAILED DESCRIPTION

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein provides an efficient mechanism for generating image tags relevant to an image. The technology analyzes aggregated data from a plurality of sources to identify text relevant to an image. The relevant text may then be ranked and used to generate image tags. The image tags may be generated based on user preferences as well.

Image tags, as used herein, refer generally to a textual descriptor/identifier for an image based on image data analyzed. Image data may be collected, received, retrieved, or the like, from multiple sources. Image data may include metadata for a particular image, previous search queries that result in rendering an image, user preferences regarding an image or other images, location information of an image, and the like. Location information, as used herein, refers generally to information identifying a location of an image such as, for example, a web page location, a user's social media profile location, or any other location where images may be provided.

The technology described herein encourages exploration and discovery in image search by providing image tags for images. The image tags may indicate a subject of the image, content within the image, categories associated with the image, and the like. Traditional searches attempt to provide captions or titles of images, but often the caption is very lengthy and/or the caption and title do not accurately describe the image itself. For example, when a user searches for "bean" and views an image of Mr. Bean, nowhere does the page indicate that the image is actually an image of Mr. Bean. Rather, captions are generated that indicate, oftentimes, a title of the image, a source of the image (e.g., photobooth.net), etc. These items are completely irrelevant and often unstructured. Providing relevant image tags greatly enhances the user experience.

Additionally, traditional search engines provide related searches to enable users to refine their search but these 'related' suggestions are based on the original search query and not the image result(s). Often, the subject of an image is different from the user's search query and typical related search suggestions are not relevant. For example, if the user is viewing an image of Mr. Bean from searching "bean," related searches may provide suggestions for "bean" but not "mr. bean" such as suggestions like "green bean" and "black bean." These suggestions are unrelated to the image viewed (i.e., the Mr. Bean (comedy) image).

Users may be able to tag their own images. For instance, social media sites allow users to tag their images (e.g., hashtag-syntax) to provide structure to describing the image the user is making available. For example, a social media post with a picture of steak and eggs may be associated with a user-generated tag such as "#steakandeggs." While this is helpful, the addition of tags is typically optional and most images tend not to have tags because of the optional nature of tagging. Additionally, there are billions of images available; too many for a user to simply tag. The technology described herein provides an efficient, system-provided mechanism to generate image tags.

Having briefly described an overview of aspects of the technology described herein, an exemplary operating environment is described below in order to provide a general context for various aspects. Referring to the figures in general and initially to FIG. 1 in particular, an exemplary computing system is shown and designated generally as exemplary computing system 100. The exemplary computing system 100 is but one example of a suitable computing environment and is not intended to suggest any limitation as to the scope of use or functionality of aspects of the technology described herein. Neither should the exemplary computing system 100 be interpreted as having any dependency or requirement relating to any one component nor any combination of components illustrated.

Figure 1:
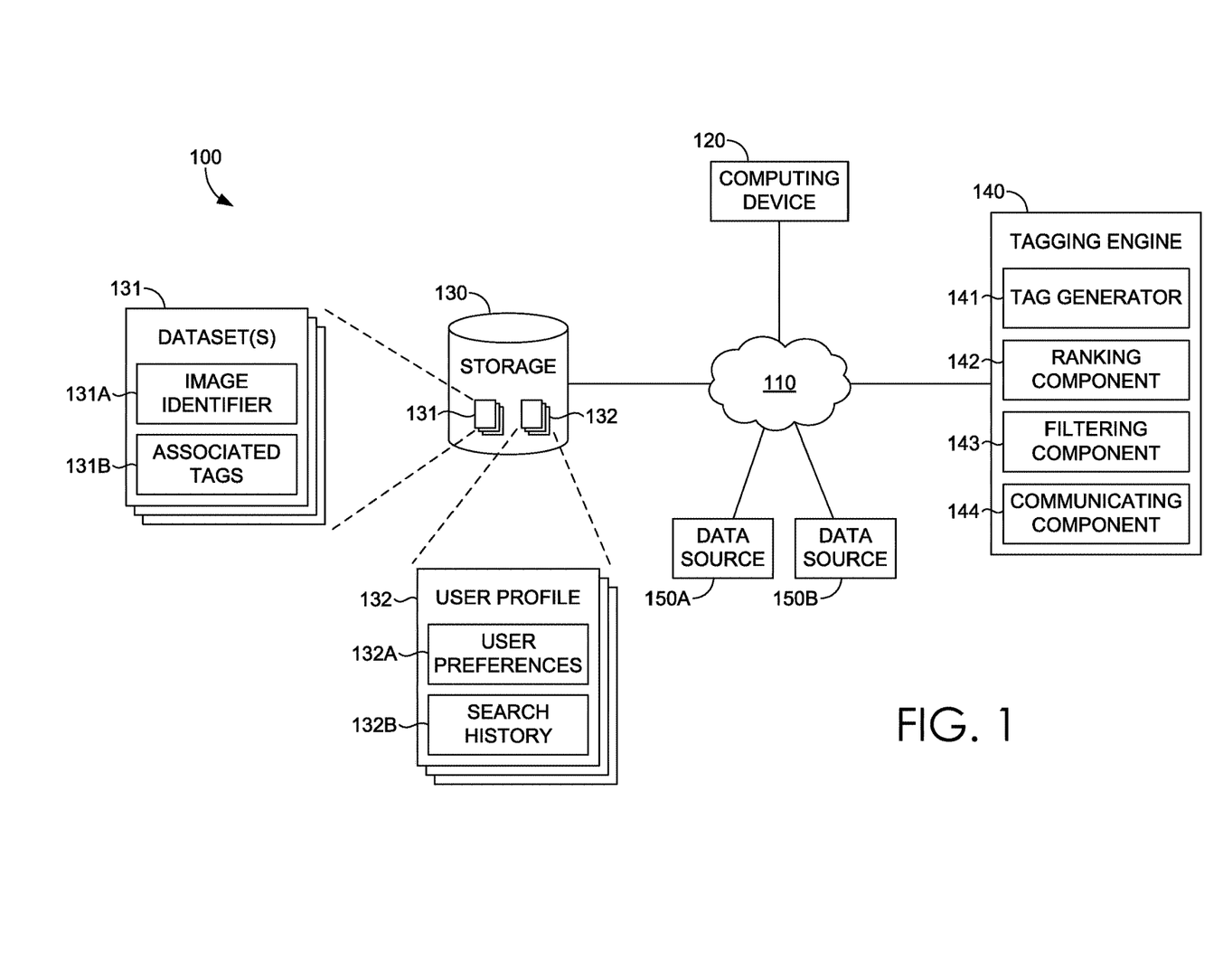
FIG. 1 is a diagram depicting an exemplary computing environment suitable for implementing aspects of the technology described herein.

Turning now to FIG. 1, a diagram is provided showing an example computing system 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

In one embodiment, the functions performed by components of system 100 are associated with one or more personal assistant applications, services, or routines. In particular, such applications, services, or routines may operate on one or more user devices (such as computing device 120), servers, may be distributed across one or more user devices and servers, or be implemented in the cloud. Moreover, in some embodiments, these components of system 100 may be distributed across a network, including one or more servers and computing devices (such as computing device 120), in the cloud, or may reside on a user device, such as computing device 120. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some embodiments functionality of these components can be shared or distributed across other components.

Among other components not shown, computing system 100 includes a network 110, a computing device 120, database 130, a tagging engine 140, and data sources 150*a* and 150*b*. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

The computing device 120 can be a computing device on the client-side of computing system 100, while the tagging engine 140, for example, can be on the server-side of operating environment 100. The computing device 120 can facilitate the creation of a record of user activities. The user activities can be analyzed to determine user preferences, content accessed on a content site, queries issued by the user, related queries issued by the user, and the like, all of which can be analyzed to determine user preferences.

The computing device 120 may comprise any type of computing device capable of use by a user. For example, in one aspect, computing device 120 may be the type of computing device described in relation to FIG. 6 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The database 130 can be accessible to any components illustrated in the example computing system 100. The database 130 can comprise one or more datasets such as dataset(s) 131 and one or more user profiles illustrated by the exemplary user profile 132. A dataset, as used herein, refers generally to a pairing of an image identifier (any unique identifier associated with and used to identify an image) and any image tags associated with the image identifier. For example, one or more image tags may be generated and associated with each image (or image identifier). Put simply, Image 123 may be associated with Image Identifier 1.2.3, which is, in turn, associated with Image Tag A, Image Tag B, and Image Tag C, while Image 456 is associated with Image Identifier 4.5.6, which is associated with Image Tag D and Image Tag E. That association is referred to herein as a dataset and may be stored in the database 130.

Also available within the database 130 is one or more user profile(s) 132. The user profile(s) 132 may include user preferences 132*a*, search history 132*b* of user(s), and the like. The information in the database 130 may be collected, received, retrieved, or the like by, for instance, the tagging engine 140 for use in generating image tags. The user profile(s) 132 can include information about the user of computing device 120. The user profile(s) 132 can include information about a user's various accounts, including user IDs. The user profile(s) 132 can also include a semantic profile of a user's interests and activities.

Data sources 150*a* and 150*b* may comprise data sources and/or data systems, which are configured to make data available to any of the various constituents of system 100. For example, in one aspect, one or more data sources provide information about images to the tagging engine 140. In one aspect, the data sources can be sources of content such as a web page. In another aspect, data sources may be session logs. Data sources 150*a* and 150*b* may be discrete from computing device 120 and the tagging engine 140 or may be incorporated and/or integrated into at least one of those components. The data sources 150a and 150b can comprise a knowledge base that stores information about images including metadata associated with images, image identifiers for each image, content sources (or locations) associated with each image, or other data related to images.

The tagging engine 140 can comprise server-side software designed to work in conjunction with client-side software on the computing device 120 so as to implement any combination of the features and functionalities discussed in the present disclosure. For example, the tagging engine 140 may run on a server and generate image tags for images. The tagging engine 140 may receive, collect, retrieve, etc., image data. This division of system 100 is provided to illustrate one example of a suitable environment, and there is no requirement for each implementation that any combination of the tagging engine 140 and the computing device 120 remain as separate entities.

The tagging engine 140 may include a tag generator 141, a ranking component 142, a filtering component 143, and a communicating component 144. The tagging engine 140 may have access to one or more components of the system 100 such as the database 130, the user profile 132, and one or more of the data source(s) 150a or 150b. The tagging engine 140 can facilitate efficient generation of image tags for images.

Initially, the tag generator 141 may be configured to aggregate data utilized during the generation of image tags. The aggregated data may be received, retrieved, collected, etc., from a plurality of sources such as, for example, data sources 150a and 150b, dataset(s) 131, user profile(s) 132, and the like. Additionally, user data may be received from a variety of sources where the data may be available in a variety of formats. For example, in some embodiments, user data received via the tagging engine 140 may be determined via one or more sensors, which may be on or associated with one or more user devices (such as computing device 120), servers, and/or other computing devices. As used herein, a sensor may include a function, routine, component, or combination thereof for sensing, detecting, or otherwise obtaining information such as user data from a source, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; content interactions; curator interactions; online activity; searches; voice data such as automatic speech recognition; activity logs; communications data including calls, texts, instant messages, and emails; website posts; other user-data associated with communication events; etc.) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, Cellular network, or IP address data), and nearly any other source of data that may be sensed or determined as described herein.

In addition to the plurality of user data types listed above that may be accessed, image data may also be accessed and used to generate image tags. The image data may include, as previously described, locations of the image (e.g., web pages that include the image, social media sites including the image, etc.), image metadata, previous search queries that rendered the image, and the like. The image data may also include a title of the webpage that contained the image, text before the image, text after the image, queries in which the image appeared in a top X image results (X being a predetermined number), the image's click scores for each query from search logs, and the like. This data is then used to extract keywords and repetitive n-grams (successive non-blocked words) and their frequencies. The extracted keywords may be referred to herein as relevant text items.

Additionally, one or more entities associated with the image may be identified by the tag generator 141. An entity, as used herein, refers generally to any subject of an image. For example, an entity can be a noun (e.g., a ball), a place (e.g., Seattle skyline), a person (e.g., Oprah Winfrey), a landmark (e.g, the Grand Canyon), etc.

Images may be associated with any of the above-described data (e.g., entities, user data, locations, search queries, etc.) and stored in, for example, database 130. From the aggregated data and the one or more relevant text items, the tag generator 141 can generate one or more image tags for an image that may also be stored in association with the image. The generation of one or more image tags may be performed in an offline setting; thereby, reducing the computational demands associated with real-time, online activities.

As used herein, "online" includes a state of being communicatively connected to, with, and/or accessible by, a network, such as the Internet or other type of communication network. Thus, when a device is online, it may communicate with other online devices, such as a server, among others. Online storage includes storage that is accessible via a network. As one example, online storage may refer to cloud storage or storage of data on a server that is accessible online, i.e., when a network connection is available. "Offline" includes a state of not being connected to, or accessible by, such a network. Offline storage includes storage that may be accessed without a network connection. Offline storage may also be referred to as local storage. As one example, a mobile device or other type of computing device may include offline, or local, storage, e.g., a memory device, which is directly accessible by a mobile/computing device.

This offline activity results in an offline data set that is generated and stored in the dataset(s) 131 portion of database 130. The offline data set(s) may include an image identifier (such as image identifier 131a), tags associated with the image (such as associated tags 131b), etc.

Because the image tags are generated offline and stored in the system (e.g., system 100), there is a limit on how many suggestions may be stored. Thus, the number of images and the suggested dataset(s) for an image is limited. In order to only populate the system 100 with relevant images and associated dataset(s), the system 100 may predict the most viewed images/most popular images and generate image tags for those identified images. To identify images to be tagged, the tag generator 141 may utilize search logs to identify popularity of previously rendered images. Image data, as described above, may then be received, retrieved, collected, etc., by the tag generator 141 for the most popular images. In embodiments, image data may be stored for other images in addition to the most popular images. For instance, image data may be stored for the most popular images in addition to a predetermined number of other images that are not included in the most popular images identified.

The ranking component 142 can rank the generated image tags based on a variety of criteria including specificity of the tag to the image (e.g., specific to what is actually in the image), relevance to the image, the keywords extracted along with the repetitive n-grams (previously described) and their frequencies, etc. The ranking component 142 may include a machine learning model to predict engagement of each suggested tag based on, for example, user session logs, the one or more tag candidates, etc.

The filtering component 143 can filter the ranked listing of image tags such that the most relevant image tags are provided. For example, a list of image tags generated for an image may include tags that are ranked higher than other, lower-ranked tags but that are not relevant to the image such as, for instance, an image of a cat that has suggested image tags about Seattle. The suggested image tags may be ranked higher than others but still not be relevant to the image. The filtering component 143 ensures that only relevant tags are provided. The tags may be selected based on relevance to an image based on, for example, weighted frequency of the tags in all the metadata that is available for the image. It should be noted that the above-described method to generate tags is not limited to image-type documents but can extend to any other type of document such as video or web documents.

Once the offline dataset(s) is generated (i.e., the image identifier is associated with one or more image tags) then the image tags may be provided in response to online requests. A search query, for instance, may prompt communication of an image and corresponding image tags by, for example, the communicating component 144. Additional prompts may include a loading of a web page that includes an image.

Figure 2:
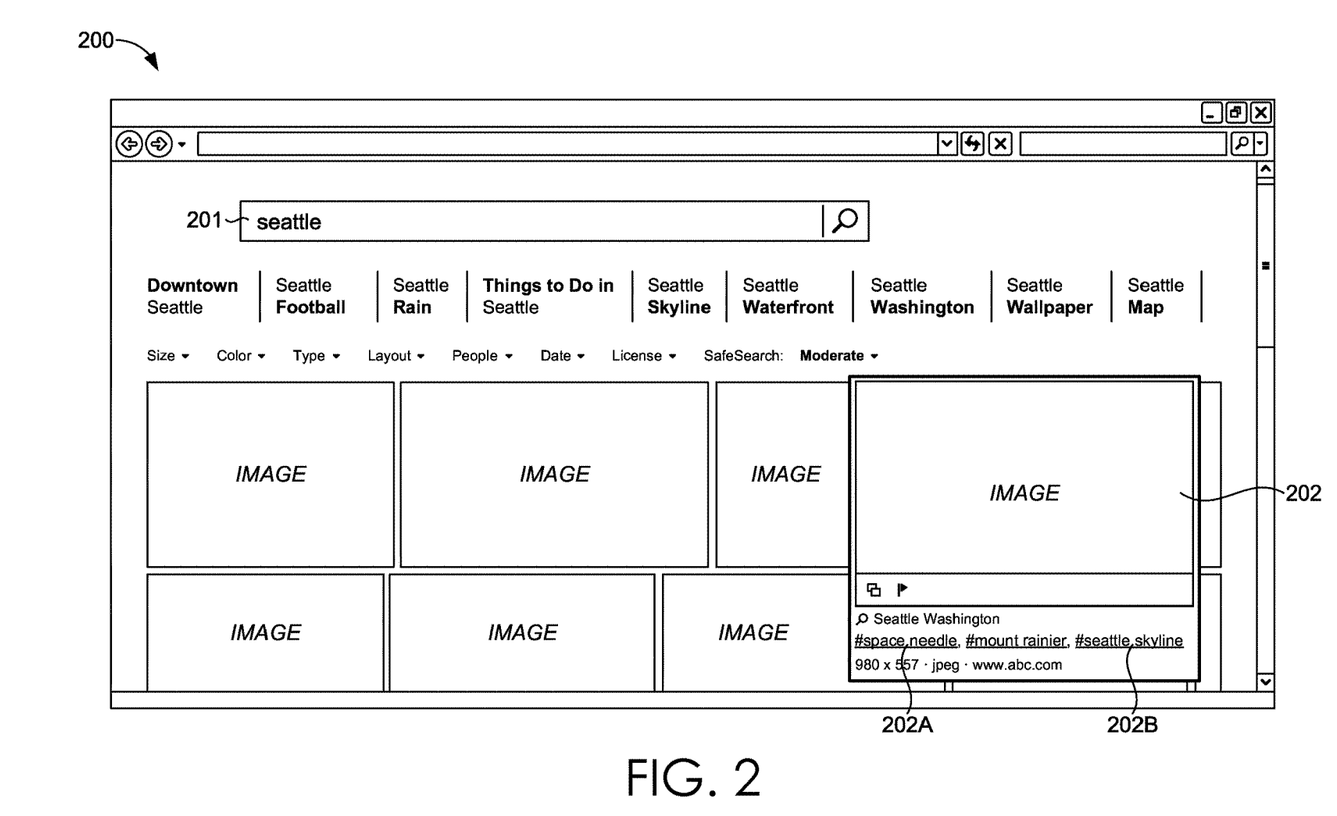
FIG. 2 is a diagram depicting a tag generation interface on a search results page, in accordance with an aspect of the technology described herein.

FIG. 2 provides an exemplary tag generation interface 200 illustrating a search query 201 as the prompt for providing the image tags. In response to receiving or identifying the search query 201, one or more images associated with the search query 201 are identified along with the corresponding image identifier. The image identifier may be used in a lookup to identify the one or more image tags generated offline and associated with the image identifier in an offline dataset. Image 202 is provided as an image associated with search query 201. Also depicted in interface 200 is image tag 202A and image tag 202B being provided with the image 202. The image 202, the image tag 202A, and the image tag 202B were likely stored as dataset(s) in a database such as database 130 of FIG. 1.

Figure 3:
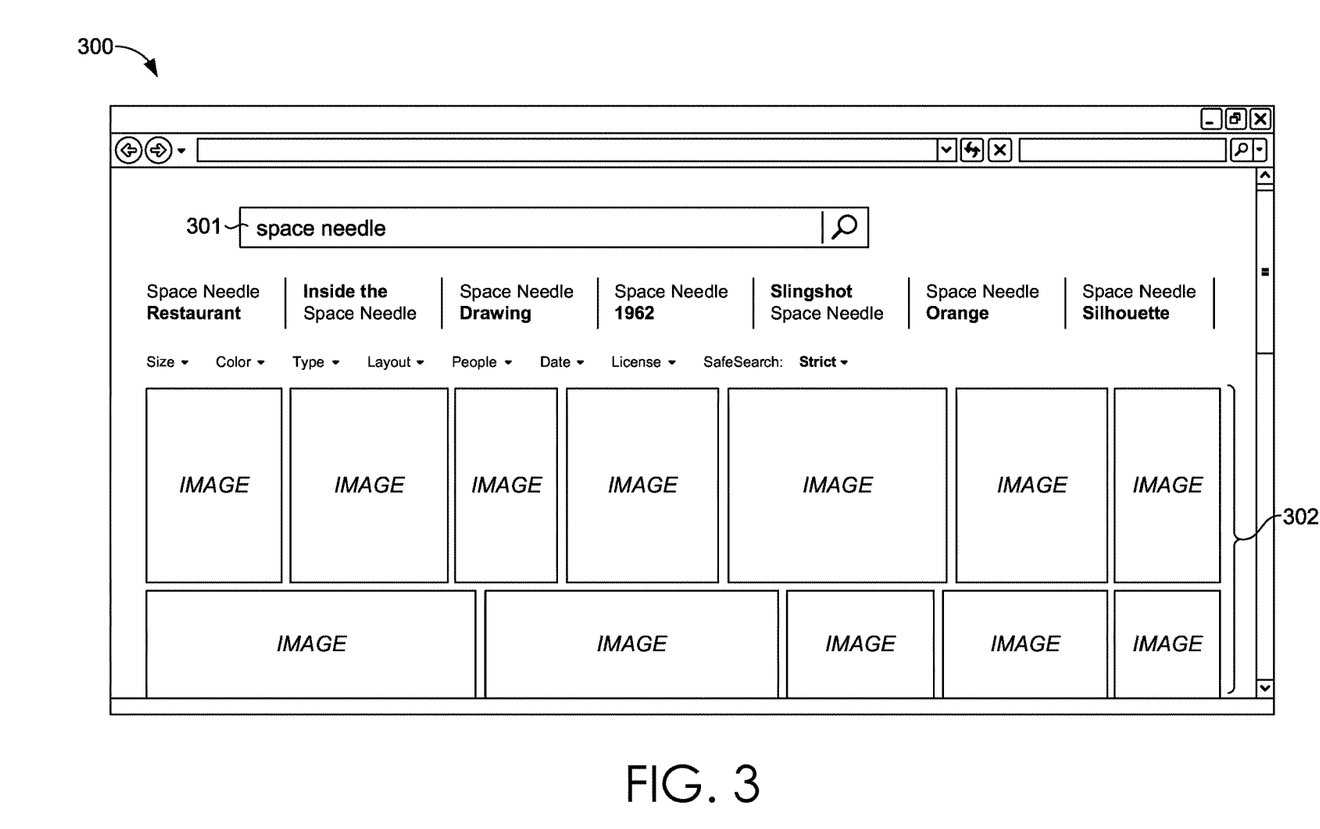
FIG. 3 is a diagram depicting a tag generation interface on a search results page, in accordance with an aspect of the technology described herein.

The image tags may be configured such that they are selectable to initiate a new search query. FIG. 3 illustrates such an example. FIG. 3 provides an exemplary tag generation interface 300 where the image tag 202A from FIG. 2 was selected and populated as a new search query 301. One or more images 302 are then provided that are associated with the new search query 301. The one or more images 302 may also include one or more image tags (as shown in FIG. 2). The provided tags may be configured such that selection thereof navigates a user to a listing of related tags rather than generating a new search query.

Figure 4:
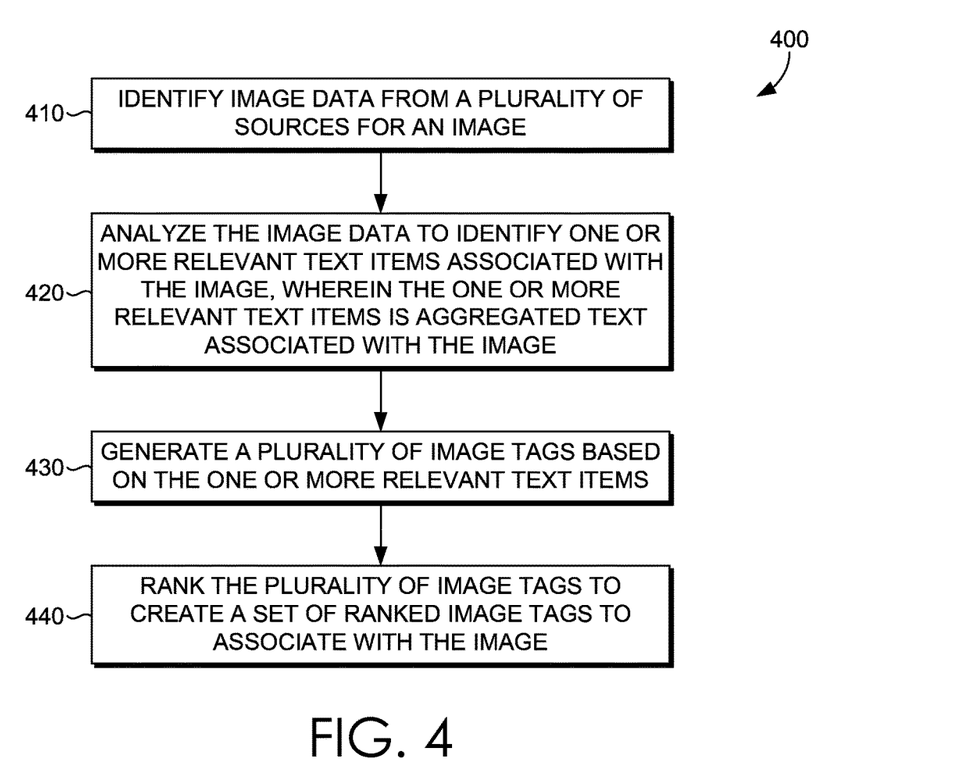
FIG. 4 is a diagram depicting a method for generating an image tag, in accordance with an aspect of the technology described herein.

Turning now to FIG. 4, a method 400 for generating tags is provided, in accordance with an aspect of the technology described herein. Method 400 could be performed by a system that includes a tagging engine, such as tagging engine 140, described previously with reference to FIG. 1. Initially, at step 410, image data is identified from a plurality of sources. As previously described, the image data may include image metadata such as a title, a title of a web page including the image, previous search queries that rendered the image, and the like. The plurality of sources may include session logs, user profiles, existing datasets, etc. At step 420, the image data is analyzed to identify one or more relevant text items associated with the image, wherein the one or more relevant text items is aggregated text associated with the image. At step 430, a plurality of image tags is generated based on the one or more relevant text items (e.g., keywords from the aggregated data). At step 440, the plurality of image tags is ranked to create a set of ranked image tags to associate with the image.

Figure 5:
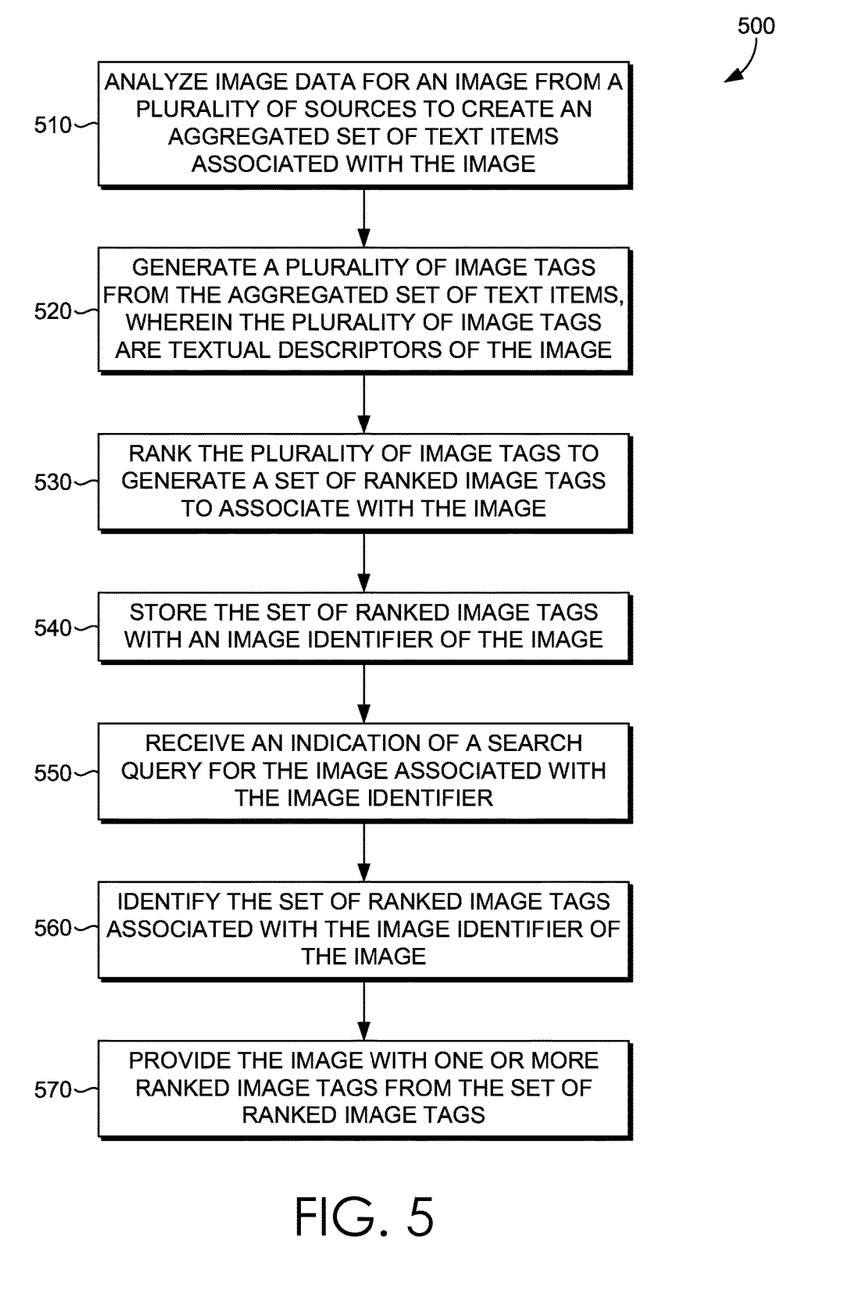
FIG. 5 is a diagram depicting a method for generating an image tag, in accordance with an aspect of the technology described herein.

Turning now to FIG. 5, a method 500 for generating tags is provided. Method 500 could be performed by a system that includes a tagging engine, such as tagging engine 140, described previously with reference to FIG. 1. Initially, at step 510, image data for an image is analyzed from a plurality of sources to create an aggregated set of text items associated with the image. At block 520, a plurality of image tags is generated from the aggregated set of text items, wherein the plurality of image tags are textual descriptors of the image. At block 530, the plurality of image tags is ranked to generate a set of ranked image tags to associate with the image. At block 540, the set of ranked image tags is stored with an image identifier of the image. This may be stored in the dataset portion of the database of FIG. 1, for instance. At block 550, an indication of a search query for the image associated with the image identifier is received. At block 560, the set of ranked image tags associated with the image identifier of the image is identified and provided with the image at block 570.

Exemplary Operating Environment

Figure 6:
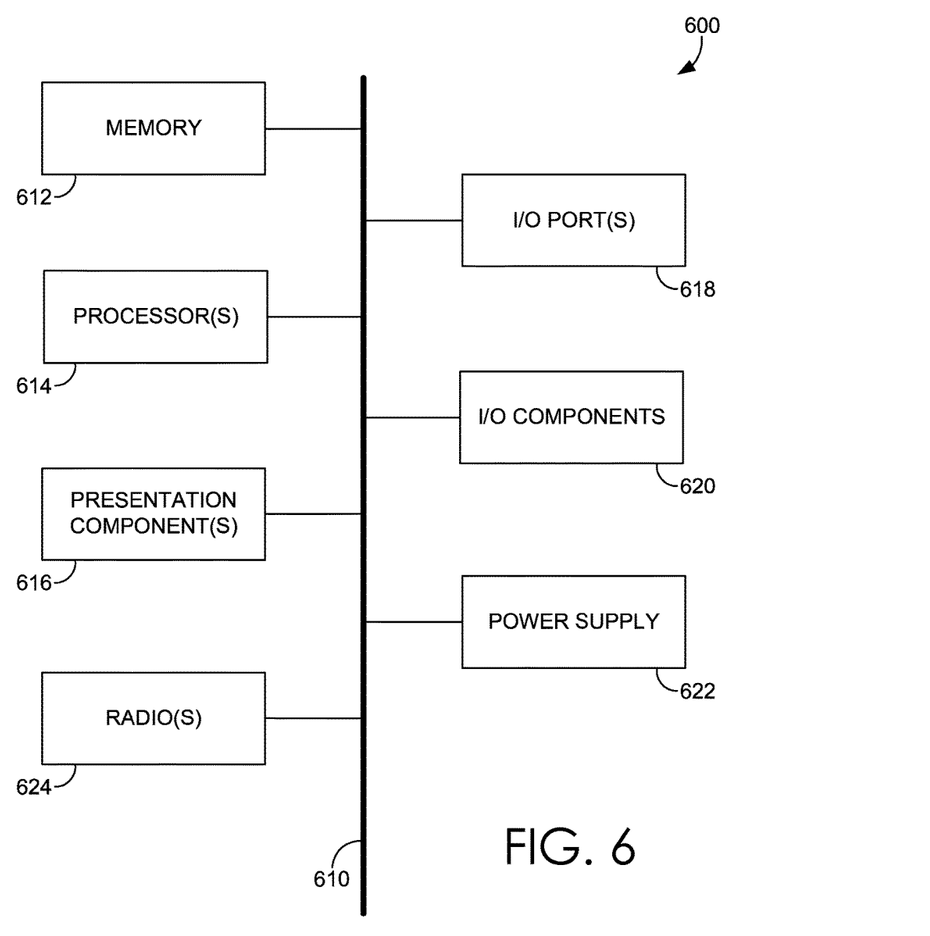
FIG. 6 is a block diagram of an exemplary computing environment suitable for implementing aspects of the technology described herein.

Referring to the drawings in general, and initially to FIG. 6 in particular, an exemplary operating environment for implementing aspects of the technology described herein is shown and designated generally as computing device 600. Computing device 600 is but one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device." The computing device 600 may be a PC, a tablet, a smart phone, virtual reality headwear, augmented reality headwear, a game console, and such.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some embodiments, the usable input area of a digitizer may coexist with the display area of a display device, be integrated with the display device, or may exist as a separate device overlaying or otherwise appended to a display device. Any and all such variations, and any combination thereof, are contemplated to be within the scope of embodiments of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The computing device 600 may include a radio. The radio transmits and receives radio communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A system for generating image tags, the system comprising:
   a processor; and
   computer storage memory having computer-executable instructions stored thereon which, when executed by the processor, implement a method for generating image tags, the method comprising:
   (1) receiving image data from a plurality of sources for an image, wherein the plurality of sources comprises at least one of a web page including the image, the image's metadata, and a search query that resulted in rendering the image;
   (2) analyzing the image data to identify one or more relevant text items associated with the image, wherein the one or more relevant text items is aggregated text associated with the image, and wherein the analyzing comprises
      a) extracting keyword and repetitive n-gram text from the image data associated with each of the plurality of sources, and
      b) aggregating the keyword and repetitive n-gram text from each of the plurality of sources into aggregated text;
   (3) generating a plurality of image tags based on the one or more relevant text items;
   (4) ranking the plurality of image tags to identify a set of ranked image tags to associate with the image, wherein ranking the plurality of image tags comprises supplying the plurality of image tags as an input to a machine learning model trained with user session logs to predict engagement of image tags wherein an output of the machine learning model is the set of ranked image tags, the ranked image tags comprising a subset of the plurality of image tags; and
   (5) in response to receiving a search query that prompts a search engine to provide at least the image for display, providing the image and one or more ranked image tags from the set of ranked image tags.

2. The computing device of claim 1, wherein the method further comprises filtering the set of ranked image tags to remove one or more low ranked image tags, wherein the one or more low ranked image tags have rankings lower than one or more other image tags of the set of ranked image tags.

3. The computing device of claim 2, wherein the filtering is performed utilizing rules that indicate removal of tags having a ranking lower than a predetermined threshold.

4. The computing device of claim 1, wherein the image data includes identifications of one or more web pages that include the image.

5. A method for generating image tags comprising:
   identifying image data from a plurality of sources for an image;
   analyzing the image data to identify one or more relevant text items associated with the image, wherein the one or more relevant text items is aggregated text associated with the image, and wherein the analyzing comprises
      extracting keyword and repetitive n-gram text from the image data associated with each of the plurality of sources, and
      aggregating the keyword and repetitive n-gram text from each of the plurality of sources into aggregated text;
   generating a plurality of image tags based on the one or more relevant text items;
   ranking the plurality of image tags to create a set of ranked image tags to associate with an image identifier assigned to the image, wherein ranking the plurality of image tags comprises supplying the plurality of image tags as an input to a machine learning model trained with user session logs to predict engagement of image tags wherein an output of the machine learning model is the set of ranked image tags, the ranked image tags comprising a subset of the plurality of image tags; and
   in response to receiving a search query that prompts providing at least the image for display,
      providing at least the image and one or more ranked image tags from the set of ranked image tags.

6. The method of claim 5, further comprising filtering the set of ranked image tags to remove one or more low ranked image tags, wherein the one or more low ranked image tags have rankings lower than one or more other image tags of the set of ranked image tags.

7. The method of claim 5, wherein the image with the one or more ranked image tags is provided to at least one remote computing device.

8. The method of claim 5, wherein the image with the one or more ranked image tags is provided for display within a search engine results page.

9. The method of claim 5, wherein the image data includes one or more search queries that have previously rendered the image.

10. The method of claim 5, wherein the image data includes one or more locations associated with the image.

11. The method of claim 10, wherein a location of the one or more locations is a web page.

12. The method of claim 5, wherein an image tag of the plurality of image tags is a textual description of the image based on the image data.

13. The method of claim 5, wherein selection of the displayed one or more ranked image tags navigates a user to a listing of related tags corresponding to the selected one or more ranked image tags.

14. The method of claim 5, wherein display of the one or more ranked image tags is responsive to a detected interaction with the image.

* * * * *